Patented Jan. 16, 1951

2,538,725

UNITED STATES PATENT OFFICE 2,538,725

CYCLOHEXYLIDENE-DIPHENOL COMPOSITION FOR SUPPRESSION OF COCCIDIOSIS

Julius E. Johnson, Jr., Midland, and Dorsey R. Mussell, Clare, Mich., assignors to The Dow Chemical Company, Midland, Mich., a corporation of Delaware No Drawing. Application April 30, 1949, Serial No. 90,768

5 Claims. (Cl. 167—53.1)

This invention relates to the control of coccidiosis and is particularly directed to methods and compositions for the suppression of coccidial infection in poultry and the like.

Domestic fowl are subject to a number of different diseases. One of these diseases, cocidiosis, is caused by minute protozoan organisms known as coccidia. These parasitic organisms pass through certain stages of development away from the host organism and later complete their life cycle in the bodies of poultry.

The disease is spread by the contamination of the feed, water, and soil with fecal droppings of fowl which harbor the parasites. The organisms have been widely distributed, being carried on or in grain sacks, running water, and shoe soles, and by birds, flies, and other insects which fly from one poultry yard to another. The ingestion of a single organism is capable of producing a mild form of the disease; the organism rapidly multiplying in the body of the fowl and later being spread to the entire flock through infected fecal droppings. Due to the great reproductive capacity of the coccidial organism and the ease with which the disease is spread, no poultry grower may ever feel free of the menace of this infection.

The coccidia invade and multiply in various organs, but particularly in the digestive tract of their host. During the process of growth and multiplication, they invade and erode the epithelial tissues of the cecum and small intestine, bringing about hemorrhage, weakness, digestive disturbances and emaciation. Birds, if they do not rapidly succumb to the infection, are rendered economically unfit by chronic forms of the disease.

Numerous remedies have been proposed and made available for the suppression of coccidiosis. Their administration has usually been through the water or feed for the fowl. Certain of these materials have been of little efficacy, while others are too toxic or too expensive for prophylactic administration. One of the difficulties encountered in such administration has been the adverse effect which certain of the materials have upon metabolic activity. Another difficulty has been the poisoning of the blood-forming organs and a subsequent reduction in the number of red and white blood cells throughout the body. These effects have made the use of many remedies hazardous and unprofitable. The need for inexpensive prophylactic methods for the suppression of coccidial infection is well recognized, as the disease constitutes one of the major problems confronting the poultry industry.

According to this invention, we have discovered that coccidial infection in poultry may be suppressed by feeding the fowl a cyclohexylidene-diphenol having the formula

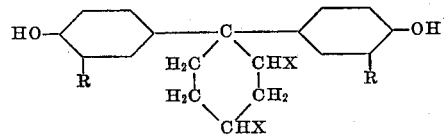

wherein R represents a lower alkyl radical or hydrogen, and one X represents a lower alkyl radical or hydrogen and the other X represents hydrogen. These compounds are crystalline solids and inexpensive to prepare. They may be fed continuously or intermittently in dosages sufficient to prevent the development of infection without adversely affecting metabolic activity or imparting any unpalatable characteristic to the flesh of the fowl. The compounds are most effective in suppressing the disease when ingested prior to or within the reasonable time following exposure to infection.

Good results are obtained when each bird is fed daily from 150 to 700 milligrams of the cyclohexylidene-diphenol compounds per kilogram of body weight. The preferred dosage varies somewhat with the particular compound employed. When the compounds are administered with feeds, satisfactory results are obtained with medicated feeds containing from 0.1 to 1 per cent by weight of the agent.

A convenient mode of operation comprises dispersing a finely ground cyclohexylidene-diphenol compound in the feed employed as a sole or part ration for the flock. The anticoccidial compound may be dissolved in a small amount of an organic solvent such as acetone or methylene chloride, the resulting mixture dispersed in the feed, and the feed dried to remove the solvent. Also the diphenol agent may be dissolved in an edible oil, such as coconut, olive, cottenseed or peanut oil, and the resulting solution dispersed in the feed. Any commercial starting, growing, or laying mash may be employed as a carrier for the agent. Such feed should contain a quantity of ground grains, meat or protein substitute, powdered milk, minerals, and vitamins sufficient to furnish a diet adequate for the metabolic requirements of the fowl concerned. Alternatively, the compounds, either alone or dispersed in a suitable non-toxic carrier, may be administered in the form of capsules or tablets.

The cyclohexylidene-diphenol compounds of this invention may be prepared by reacting 2 moles of phenol or a suitable substituted phenol with 1 mole of cyclohexanone, 2-methylcyclohexanone or 4-methylcyclohexanone. In practice, the use of a molecular excess of the phenolic reactant is preferred. Examples of substituted phenols which may be employed are 2-methylphenol, 2-ethylphenol, and 2-isopropylphenol. The reaction is carried out in the presence of a sulphur-containing catalyst, such as hydrogen sulphide or normalbutylmercaptan and of an acid condensing agent such as hydrochloric acid, sulphuric acid, or hydrogen chloride. Good results are obtained in preparations carried out at a temperature of 40° C. or lower and employing 5 moles of the phenolic reactant per mole of cyclohexanone or methylcyclohexanone. In practice from about 0.1 to 0.3 moles of hydrogen chloride per mole of the phenolic reactant present in the mixture has been found to favor the production of the compounds in high yields.

The phenol, cyclohexanone or methylcyclohexanone, and catalyst are mixed together and gaseous anhydrous hydrogen chloride bubbled through the reaction zone at a temperature below 40° C. The condensation begins immediately upon the introduction of hydrogen chloride with the production of the desired cyclohexylidenediphenol compound and water of reaction. Upon completion of the reaction, the desired product may be separated in conventional manner by repeated washing with water, fractional distilling under reduced pressure to recover water and excess phenol, and steaming the residue to remove last traces of phenol.

The following examples illustrate the invention but are not to be construed as limiting the same.

*Example 1*

4,4'-cyclohexylidene-diphenol (melting at 186° to 187° C.) having the formula

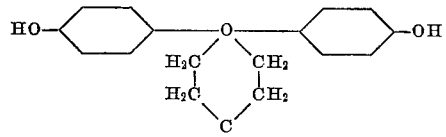

was ground through a screen having 0.295 millimeter square openings. This finely ground diphenol was mechanically dispersed in a commercial starting mash to produce a composition containing 0.3 per cent by weight of the agent. This composition and unmodified starting mash were fed as a sole ration to two groups of chickens. Each group consisted of four chickens which were two weeks of age. 48 hours after the initiation of the diet, 40,000 *Eimeria tenella* oöcysts were introduced directly into the crop of each bird. Seven days later the birds were sacrificed and autopsied. An examination of each bird was made to determine cecal necrosis, and a sample of cecal contents removed and examined microscopically for the presence or absence of oöcysts. The numerical ratings 0, 1, 2, 4, and 8, corresponding to none, trace, slight, moderate, and severe, respectively, were assigned both the degree of necrosis and the incidence of oöcysts in the cecum. The ratio of the summation of these ratings to the total number of observations carried out in the particular group of fowl gives the degree of infection present in the birds. A comparison between the degrees of infection of treated and untreated control groups serves as a basis for estimating the efficacy of the treatment according to the following formula:

$$\text{Index of efficacy} = \left(\frac{x-y}{x}\right).100$$

wherein $x$ represents the degree of infection of control birds and $y$ the degree of infection of treated birds. The numerical ratings, degrees of infection and index of efficacy are recorded in the following table:

|  | Chickens Fed Modified Mash | | | | Chickens Fed Unmodified Mash | | | |
| --- | --- | --- | --- | --- | --- | --- | --- | --- |
| Chicken No | 1 | 2 | 3 | 4 | 1 | 2 | 3 | 4 |
| Numerical Rating of Cecal Necrosis | 0 | 0 | 0 | 2 | 8 | 8 | 8 | 8 |
| Numerical Rating of Abundance of oöcysts | 0 | 0 | 0 | 4 | 4 | 4 | 8 | 4 |
| Degree of Infection in the Group | 0.75 | | | | 6.5 | | | |
| Index of Efficacy | 89 | | | | | | | |

*Example 2*

Various cyclohexylidene-diphenol compounds of the invention were separately dissolved in a small quantity of acetone and the resulting solution dispersed in starting mash to prepare compositions containing a known concentration of the anticoccidial agent. These compositions and unmodified mash were tested in a manner similar to that of Example 1. The concentrations and types of diphenol compounds employed in the mash compositions together with the indices of efficacy are recorded in the following table. In a control operation, a commercial anticoccidial agent, sulfaguanidine, was dispersed in starting mash in the amount of 0.5 per cent by weight of the composition and this mash and unmodified mash tested in the above described manner.

| Active Ingredient | Formula | | Per Cent by Weight of Active Ingredient in Mash | Index of Efficacy |
| --- | --- | --- | --- | --- |
| 4,4'-(2-methylcyclohexylidene)-diphenol | HO—⟨⟩—C—⟨⟩—OH  H₃C  C—H  CH₃  H₂C  CH₂  CH₂ | melting at 236°–240° C. | 0.4 | 75 |

| Active Ingredient | Formula | | Per Cent by Weight of Active Ingredient in Mash | Index of Efficacy |
|---|---|---|---|---|
| 4,4'-(4-methylcyclohexylidene)-diphenol | (structure) | freezing at 178° C. | 0.4 | 86 |
| 4,4'-cyclohexylidene-di-(2-methylphenol) | (structure) | freezing at 187° C. | 0.3 | 84 |
| 4,4'-cyclohexylidene-di(2-isopropylphenol) | (structure) | melting at 109.5°–111.5° C. | 0.4 | 78 |
| Sulfaguanidine | | | 0.5 | 73 |

We claim:

1. A composition for the suppression of coccidial infection in fowl which comprises a poultry feed and dispersed therein as an active ingredient a cyclohexylidene-diphenol having the formula

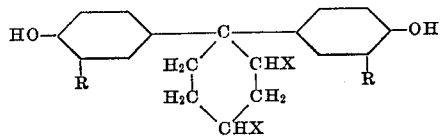

wherein R represents a member of the group consisting of hydrogen and the lower alkyl radicals containing from 1 to 3 carbon atoms, inclusive, and one X represents a member of the group consisting of methyl and hydrogen and the other X represents hydrogen.

2. A composition as defined in claim 1 wherein the cyclohexylidene-diphenol is present in the amount of from 0.1 to 1.0 per cent by weight of the composition.

3. A composition for the suppression of coccidial infection in poultry which comprises a poultry feed and dispersed therein as an active ingredient 4,4'-cyclohexylidene-diphenol in the amount of from 0.1 to 1.0 per cent by weight of the composition.

4. A composition for the suppression of coccidial infection in poultry which comprises a poultry feed and dispersed therein as an active ingredient 4,4'-cyclohexylidene-di(2-methylphenol) in the amount of from 0.1 to 1.0 per cent by weight of the composition.

5. A composition for the suppression of coccidial infection in poultry which comprises a poultry feed and dispersed therein as an active ingredient 4,4'-(4-methylcyclohexylidene)-diphenol in the amount of from 0.1 to 1.0 per cent by weight of the composition.

JULIUS E. JOHNSON, JR.
DORSEY R. MUSSELL.

REFERENCES CITED

The following references are of record in the file of this patent:

UNITED STATES PATENTS

| Number | Name | Date |
|---|---|---|
| 1,760,758 | Korten | May 27, 1930 |
| 2,279,421 | Tisdale | Apr. 14, 1942 |

OTHER REFERENCES

Craige, North American Veterinarian, vol. 27, January 1946, pages 26 to 30.

Certificate of Correction

Patent No. 2,538,725                                                        January 16, 1951

JULIUS E. JOHNSON, Jr., ET AL.

It is hereby certified that error appears in the printed specification of the above numbered patent requiring correction as follows:

Column 3, lines 52 to 57, for that portion of the formula reading

and that the said Letters Patent should be read as corrected above, so that the same may conform to the record of the case in the Patent Office.

Signed and sealed this 1st day of May, A. D. 1951.

[SEAL]

THOMAS F. MURPHY,
*Assistant Commissioner of Patents.*